Nov. 19, 1957 J. A. AMBERG 2,813,599
LUBRICATING DEVICE FOR BICYCLE SPROCKET CHAIN
Filed March 11, 1955

INVENTOR.
JOHN A. AMBERG
BY
Chapin + Neal
ATTORNEYS

2,813,599
LUBRICATING DEVICE FOR BICYCLE SPROCKET CHAIN

John A. Amberg, Westfield, Mass., assignor to The Westfield Manufacturing Company, Westfield, Mass., a corporation of Massachusetts Application March 11, 1955, Serial No. 493,700

1 Claim. (Cl. 184—16)

This invention relates to a device for cleaning and lubricating the chain of a sprocket chain driven bicycle.

An object of the invention is to provide a novel device adapted for mounting on a conventional type bicycle chain guard as a permanently fixed accessory for maintaining the chain of the bicycle in clean condition at all times and constantly lubricating the same while the bicycle is being operated.

The above and other objects will more clearly appear from the following detailed description of the device, with particular reference to the accompanying drawings, in which, Fig. 1 is a perspective view of a conventional bicycle chain drive assembly with a chain guard in which the new lubricating and cleaning device is incorporated;

Figure 1:
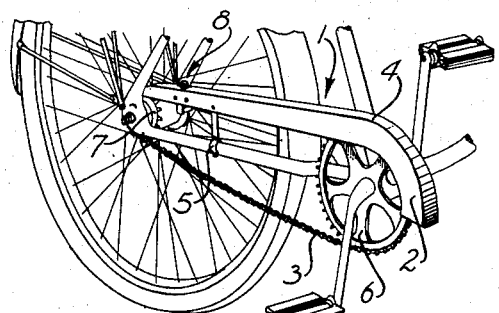

A conventional type of bicycle chain guard 1 is shown by Fig. 1. As may be noted the guard is formed with a vertical wall 2 lying outwardly of the upper run of the chain 3 and a flanged top wall 4 overlying the chain. Forwardly the guard is supported by a bracket (not shown) suitably fixed adjacent the crank hanger and rearwardly by a conventional bracket, as at 5, fixed to a rear fork tube. The guard 1 serves primarily, of course, to protect a rider's clothes from becoming soiled by the sprocket chain or tangled in the sprocket at 6. It serves in the present disclosure as a most convenient support for attachment of the new lubricator and cleaner device of this invention.

It is well known that a bicycle drive chain usually becomes more or less covered with dirt, grime and greasy sludge from material kicked up by the tire during riding and that during periods of storage the accumulation of dirt etc. on the chain may become either lumped and tacky or tend to dry out and cause rust. It is the object of this invention to eliminate the accumulation of foreign matter on the bicycle chain during its operation, to maintain the chain in clean and lubricated condition at all times during periods of operation or storage and to prevent the rusting thereof.

The device is preferably fixed to the vertical wall 2 of the guard as shown in the drawings and may be positioned at any location between the rear wheel sprocket at 7 and drive sprocket 6 along the upper run of the chain. Preferably it is disposed as at 8 (Fig. 1) immediately after being turned around the rear sprocket 7. Being attached to the inner face of wall 4 the device is inconspicuously located and is somewhat less subject at this location to possible damage or dislocation by any chance damage to the guard itself.

Figures 4, 5:
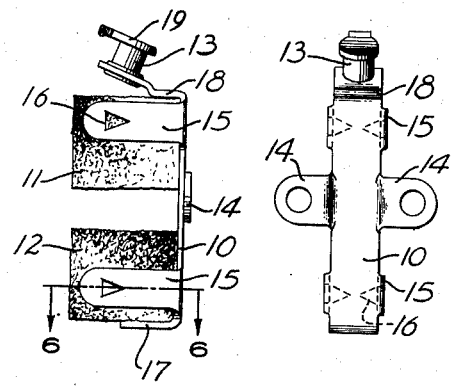
Fig. 4 is a full scale side elevational view of the device.
Fig. 5 is a rear elevational view thereof.
Figure 6:
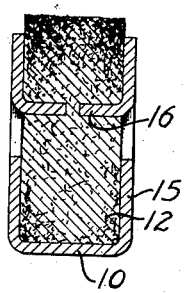
Fig. 6 is a section on an enlarged scale on line 6—6 of Fig. 4.

The device, referring now to Figs. 4, 5, and 6, is formed with a mounting plate 10, with a pair of vertically spaced pad supporting means holding an upper and lower absorbent pad 11 and 12 in spaced relation for passage of the chain between the pads, and an oil cup 13 overlying the upper pad 11.

Figure 2:
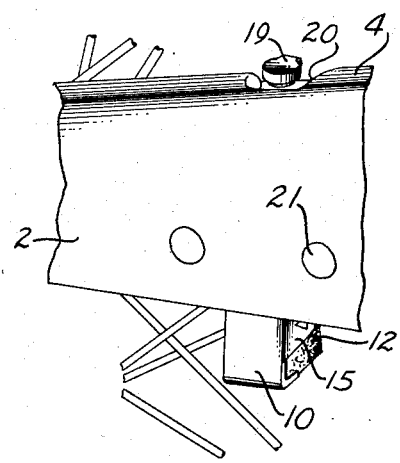
Fig. 2 is a fragmentary view on an enlarged scale and from the outer side of the bicycle chain guard with the new device mounted thereon.
Figure 3:
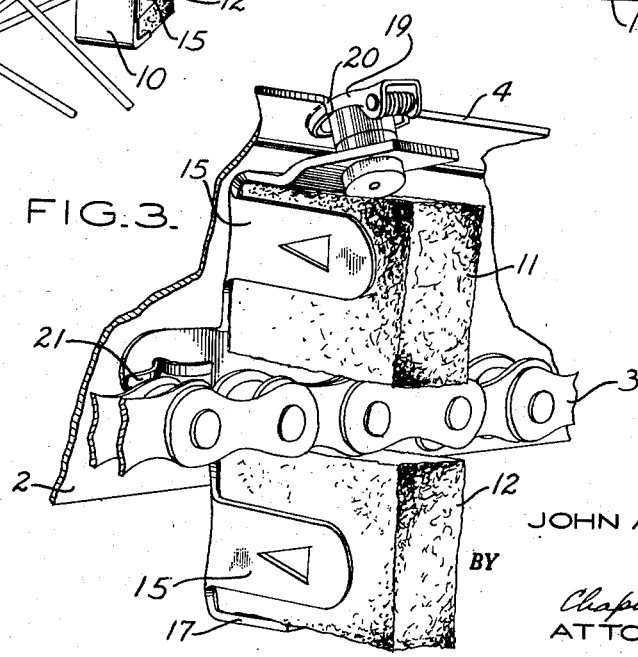
Fig. 3 is a fragmentary view on an enlarged scale of the new device mounted on the chain guard as seen from the inner side of the guard of Fig. 2.

The plate 10 may be formed with integral laterally extending mounting ears as at 14 for fixing to the guard wall 2 as shown by Figs. 2 and 3. The pad supporting means may be formed by integral forwardly or outwardly extending arms 15 bent at opposite side edges of plate 10 in the upper and lower portions of the plate. Each arm as shown may be provided with inwardly directed prongs 16 formed by punched portions bent from the arm itself to pierce the material of the pads 11 and 12 and securely hold the same.

At the lower end of the plate 10 a lower flanged shelf 17 is provided for seating the lower pad 12. At the upper end of the plate is an extension 18 overlying the top pad 11 for seating the upper pad against the same. The extension is also upwardly and forwardly angled at its outer end for receiving the oil cup 13. As shown by Figs. 2 and 3 the oil cup with spring mounted cap 19 extends in the mounted assembly to the top flanged wall 4 of the guard, being received there in a notch 20 for easy access to the cup. The assembled device can be fixed in any suitable manner to the vertical wall 2 as by the clips shown in Fig. 3.

It will be readily understood that the arms 15 of the plate 10 are in the initial manufacture of the device bent inwardly to grip the pad and cause the prongs to pierce the material. The pads can be quickly and surely seated in the assembly against the top and bottom corners formed by the flanges 18 and 17. Thus the opposed adjacent surfaces of the pads 11 and 12 will be vertically spaced to receive the chain between the same for proper contact with the chain. The pads may of course be readily replaced or adjusted, if worn after long continued use, by spreading arms 15 and inserting the pads back into the assembly with a pair of common pliers.

In practice the pads are preferably positioned for a light contact against the upper pad 11 along the upper surfaces of the chain links when the crank is being operated. It will be realized when the crank is being turned the upper run of the chain is more or less in taut condition with the chain being drawn forwardly toward the crank. A light contact with pad 11 will thus clean and lubricate the top of the chain by depositing a film of oil from the absorbent pad. When the brake is applied as with a conventional coaster brake, or the rider is coasting on the bicycle, the chain will slacken and thus the lower surfaces of the links of the chain will be periodically cleaned by intermittent contact with pad 11. It will be realized that oil fed to the upper pad 11 by the cup 13 may pass to pad 12 by being deposited on the top of the chain and fed from the bottom of the chain to pad 12 during operation of the bicycle. The pads may be of any suitable absorbent material as small blocks of cotton waste or felted material.

What is claimed is:

A lubricating and cleaning device for bicycle sprocket chains comprising a one piece blank of metal having an elongated rectangular base portion, a gripping arm bent at right angles and extending from each side of the upper portion of the base in opposed spaced relation and a gripping arm similarly bent and extending from each side of the lower portion of said base, mounting ears extending laterally of and from each side of the base intermediate said upper and lower gripping arms, upper and lower block-shaped absorbent pads held in spaced relation between the opposed upper and lower arms respectively with each said arm having an inwardly directed prong piercing the material of said pad for securing the same, said base having at the upper and lower end edges an inwardly bent extension overlying and underlying respectively the upper and lower pads for an endmost positioning seat therefor, said upper extension having an upwardly directed offset free end portion, and an oil cup mounted thereon with an outlet directed onto the top edge surface of the upper pad to feed lubricant thereto.

References Cited in the file of this patent

UNITED STATES PATENTS

| | | |
|---|---|---|
| 501,626 | Percy | July 18, 1893 |
| 556,786 | Thompson | Mar. 24, 1896 |
| 635,778 | Hudelson | Oct. 31, 1899 |
| 653,445 | Garland | July 10, 1900 |
| 1,798,450 | Brugger | Mar. 31, 1931 |
| 2,007,217 | Rose | July 9, 1935 |

FOREIGN PATENTS

| | | |
|---|---|---|
| 665 | Great Britain | of 1895 |
| 399,610 | Great Britain | Oct. 12, 1933 |
| 18,963 | Switzerland | Mar. 25, 1899 |